(12) United States Patent
Watanabe et al.

(10) Patent No.: US 7,685,915 B2
(45) Date of Patent: Mar. 30, 2010

(54) CUTTING AUXILIARY DEVICE IN BAND SAW

(75) Inventors: Shunsuke Watanabe, Shizuoka (JP);
Masaru Yoshida, Shizuoka (JP)

(73) Assignee: Off Corporation Inc., Shizuoka-shi, Shizuoka-ken (JP)

( * ) Notice: Subject to any disclaimer, the term of this patent is extended or adjusted under 35 U.S.C. 154(b) by 181 days.

(21) Appl. No.: 11/727,045

(22) Filed: Mar. 23, 2007

(65) Prior Publication Data
US 2007/0221031 A1    Sep. 27, 2007

(30) Foreign Application Priority Data
Mar. 24, 2006    (JP) ............... 2006-084096

(51) Int. Cl.
*B23D 55/00*    (2006.01)
*B27B 13/00*    (2006.01)

(52) U.S. Cl. ................. 83/802; 83/522.15; 83/809

(58) Field of Classification Search ............ 83/788, 83/809, 810, 811, 812, 813, 522.11, 522.13, 83/522.15–522.21, 802
See application file for complete search history.

(56) References Cited
U.S. PATENT DOCUMENTS

| | | | | |
|---|---|---|---|---|
| 1,886,321 A | * | 11/1932 | Walker | 83/166 |
| 3,259,155 A | * | 7/1966 | Kawabata | 83/13 |
| 3,733,952 A | * | 5/1973 | Fukugami et al. | 83/789 |
| 3,801,089 A | * | 4/1974 | Fukugami et al. | 83/820 |
| 5,103,566 A | | 4/1992 | Stebe | 33/42 |
| 5,320,016 A | * | 6/1994 | Spath et al. | 83/801 |
| 2004/0163522 A1 | * | 8/2004 | Huang | 83/520 |

FOREIGN PATENT DOCUMENTS

JP    06-270102    9/1994

* cited by examiner

*Primary Examiner*—Stephen Choi
(74) *Attorney, Agent, or Firm*—Jacobson Holman PLLC

(57) ABSTRACT

In a band saw, blade drift is corrected and straight line cutting of an object is easily performed. A cutting auxiliary device in the band saw used to correct a shift of a cutting line when the cutting line is shifted from a straight line in the band saw for cutting a work by using a flexible steel band. The cutting auxiliary device in the band saw has a laser projector attached to a band saw main body side and projecting a laser beam so as to be overlapped with the shifted cutting line when the work is straightly cut by the flexible steel band on the working board and the cutting line is shifted from the straight line; and a working board fixing portion for fixing the working board to a receiving portion of the band saw main body side in a place which the straight line of the laser beam projected from the laser projector and a mark on the working board are aligned.

3 Claims, 6 Drawing Sheets

FIG. 1
FIG. 2
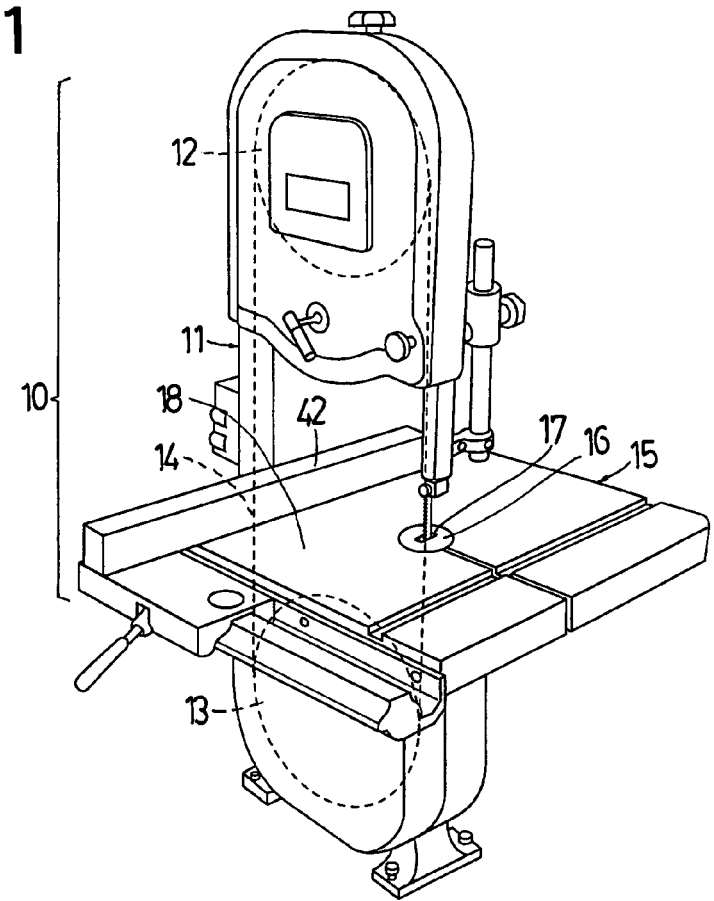
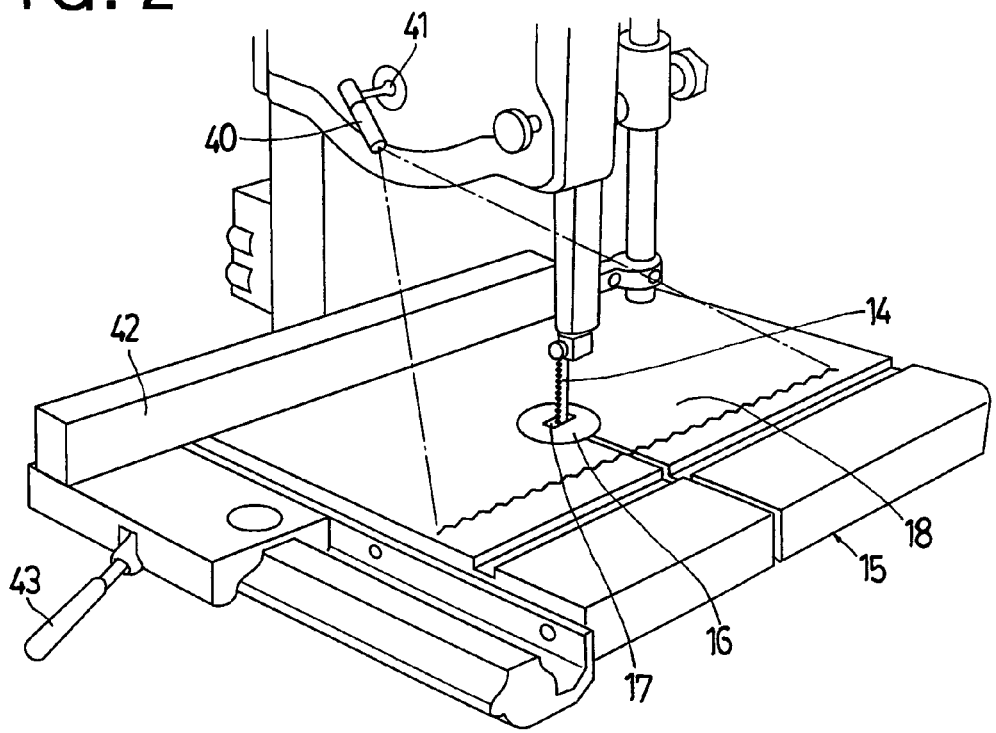

CUTTING AUXILIARY DEVICE IN BAND SAW

BACKGROUND OF THE INVENTION

1. Technical Field

The present invention relates to a cutting auxiliary device in a band saw for cutting a work by using a flexible steel band.

2. Background Art

In the work using the band saw, a cutting work must be made by considering a drift of the flexible steel band called a blade. The drift of the blade is a phenomenon in which the work is not straightly cut, but is gradually shifted rightward or leftward even when the work is straightly sent with respect to the blade. It is considered that the drift is caused by a habit of the blade, the grain of wood, etc. Further, it is known that the drift of a narrow blade in width is easily caused in comparison with a wide blade in width. When the cutting work is made by leaving the drift as it is, no cutting can be performed as shown by a marking-off line drawn on the work even when a ruler is used. Accordingly, each person corrects a direction of the ruler and makes the work so as to cancel the drift.

Therefore, the inventor has previously developed an auxiliary device for cutting which corrects an influence of the drift of the steel band and can perform the cutting. This device is developed for circular cutting. However, a correcting mechanism is interposed between a working board and a device main body to shift a direction of the device main body to a direction shifted by the drift from a virtual cutting line using the steel band. One portion of the device main body shifted in the direction is constructed so as to become parallel with a sending direction of the steel band. However, this device also has the advantage that this device is easily attached to the working board by a fixing means such as a clamp when this device is diverted to straight line cutting. However, an operation for a correcting mechanism and positioning must be performed by fastening and loosening a small screw. Therefore, the delicate problem that a shift is caused by loosely setting a fastening amount of the screw is also included.

SUMMARY OF THE INVENTION

The invention is made by noticing the above points, and its object is to correct the so-called blade drift and easily perform the straight line cutting of an object. Further, another object of the invention is to realize an accurate correction by a simple operation.

To solve the above problem, the invention has a means constructed by a cutting auxiliary device used to correct a shift of a cutting line when the cutting line is shifted from a straight line in a band saw for cutting a work by using a flexible steel band, wherein the cutting auxiliary device in the band saw comprises:

a working board having a board face for performing an operation for cutting the work and equipping an edge port plate for passing the flexible steel band on the board face;

a working board support portion for supporting the working board so as to be horizontally rotated with the flexible steel band as a center;

a laser projector attached to a band saw main body side and projecting a laser beam so as to be overlapped with the shifted cutting line when the work is straightly cut by the flexible steel band on the working board and the cutting line is shifted from the straight line; and a working board fixing portion for fixing the working board to a receiving portion of the band saw main body side in a place which the straight line of the laser beam projected from the laser projector and a mark on the working board are aligned.

The band saw as an object of the invention is a device for cutting and processing the work by using the flexible steel band approximately having the same concept as the band saw, and is also called a bandsaw (board). In many cases, wood is a processing object. However, for example, a so-called woodworking board, a paper working material, a resin material, a light metal, their composite material, etc. except for wood can become a processing object.

The band saw has a basic construction in which at least a pair of wheels is vertically arranged, and the flexible steel band of an endless belt shape is wound around these wheels. The working board is arranged as a table for making a work between the wheels. With respect to the flexible steel band set to an edge port plate portion of the working board, the work is moved on the working board, and a cutting work of an object is made. A slit for passing the flexible steel band is formed in the edge port plate. A portion for vertically attaching the pair of wheels, an edge port plate portion, etc. among the above members belong to the band saw main body side.

The working board has a board face for performing an operation for cutting the work, and the edge port plate for passing the flexible steel band is equipped on the board face. Accordingly, the board face of the working board takes a horizontal posture, and a cutting direction provided by the flexible steel band becomes orthogonal with respect to the board face at that time. However, a posture inclined from the horizontal posture can be also taken to perform cutting in a non-orthogonal state with respect to the work.

When the working board takes the horizontal posture, the working board support portion can support the working board so as to be horizontally rotated with the flexible steel band as a center. Accordingly, the working board can be rotated within a horizontal plane with the flexible steel band as a center. The working board support portion is also set to be able to support the working board so as to be horizontally rotated with the flexible steel band as a center when no working board takes the horizontal posture. A rotating range may be set to have a range required to correct the drift estimated in cutting of wood.

Further, as the construction of the working board support portion, it is desirable to take a construction constructed by a base portion having a circular planar shape and arranged on the band saw main body side, and also constructed by a receiving portion arranged on this circular base portion and having a circular concave portion fitted to the circumference of the circular base portion. Further, the base portion and the receiving portion desirably take a construction in which the base portion and the receiving portion are fastened and integrally fixed by an arbitrary fastening tool.

The device of the invention equips a laser projector attached to the band saw main body side. When the work is straightly cut by the flexible steel band on the working board and a cutting line is shifted from the straight line, the laser projector projects a laser beam so as to be overlapped with this shifted cutting line. The laser projector is a means for projecting the straight line onto a working board face. If this object can be attained as a device, it does not particularly care about a device kind. It is possible to use a device sold at a market and able to project the straight line using the laser beam.

It is necessary to fix the working board to the receiving portion of the band saw main body side in a place in which the straight line of the laser beam projected from the laser projector and a mark on the working board are aligned. Therefore, the working board fixing portion is used in this device. The working board fixing portion has a fastening tool to fasten and constantly fix the working board and its receiving portion. The fastening tool is interposed in the working board and the receiving portion, and fastens and fixes the working board to the base portion fixed to the band saw main body side.

The invention is constructed and operated as mentioned above. Accordingly, the working board is fixed to the receiving portion of the band saw main body side by aligning the straight line of the laser beam projected from the laser projector and a mark on the working board. Thus, the so-called blade drift is corrected and straight line cutting of an object can be easily performed. Further, in accordance with the invention, an accurate correction can be realized by a simple operation in which the straight line of the laser beam and the mark on the working board are aligned and the working board is fixed to the receiving portion of the band saw main body side.

BRIEF DESCRIPTION OF THE DRAWINGS

FIG. 1 is a perspective view showing an entire band saw applying a cutting auxiliary device in accordance with the invention thereto.

FIG. 2 is an enlarged view of a main portion in FIG. 1.

DESCRIPTION OF THE PREFERRED EMBODIMENTS

Figure 3:
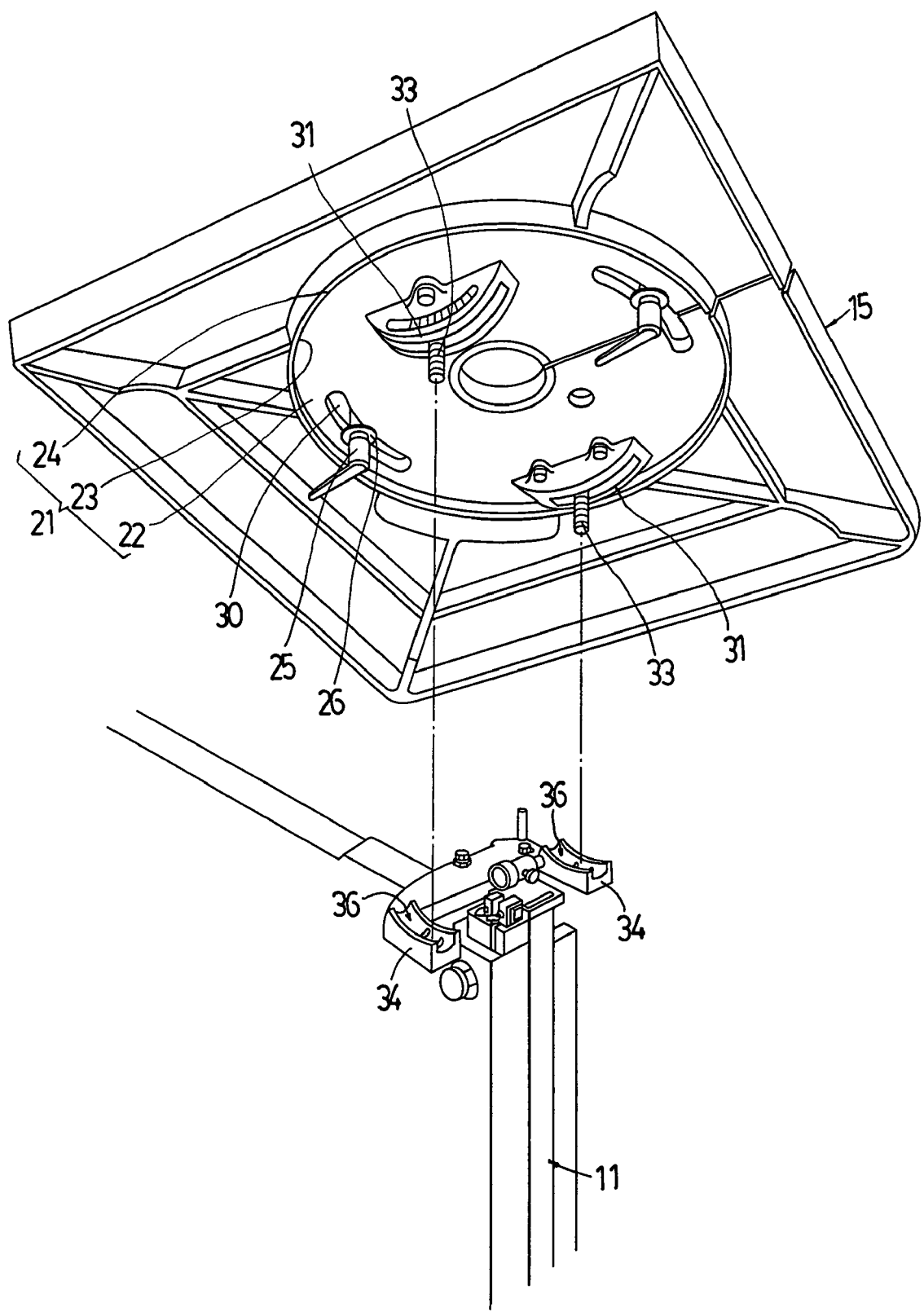
FIG. 3 is an exploded perspective view showing the lower face of a working board.

A cutting auxiliary device in a band saw of the invention will next be explained in more detail with reference to an illustrated embodiment mode. In each figure, reference numerals 10 and 11 respectively designate a band saw and its main body. Reference numerals 12, 13 designate a pair of upper and lower wheels. Reference numeral 14 designates a flexible steel band of an endless belt shape wound around these wheels. A working board 15 is arranged as a table for a work between the pair of upper and lower wheels 12, 13. A slit 17 for passing the flexible steel band 14 is formed in an edge port plate 16 of the working board 15.

Figure 4:
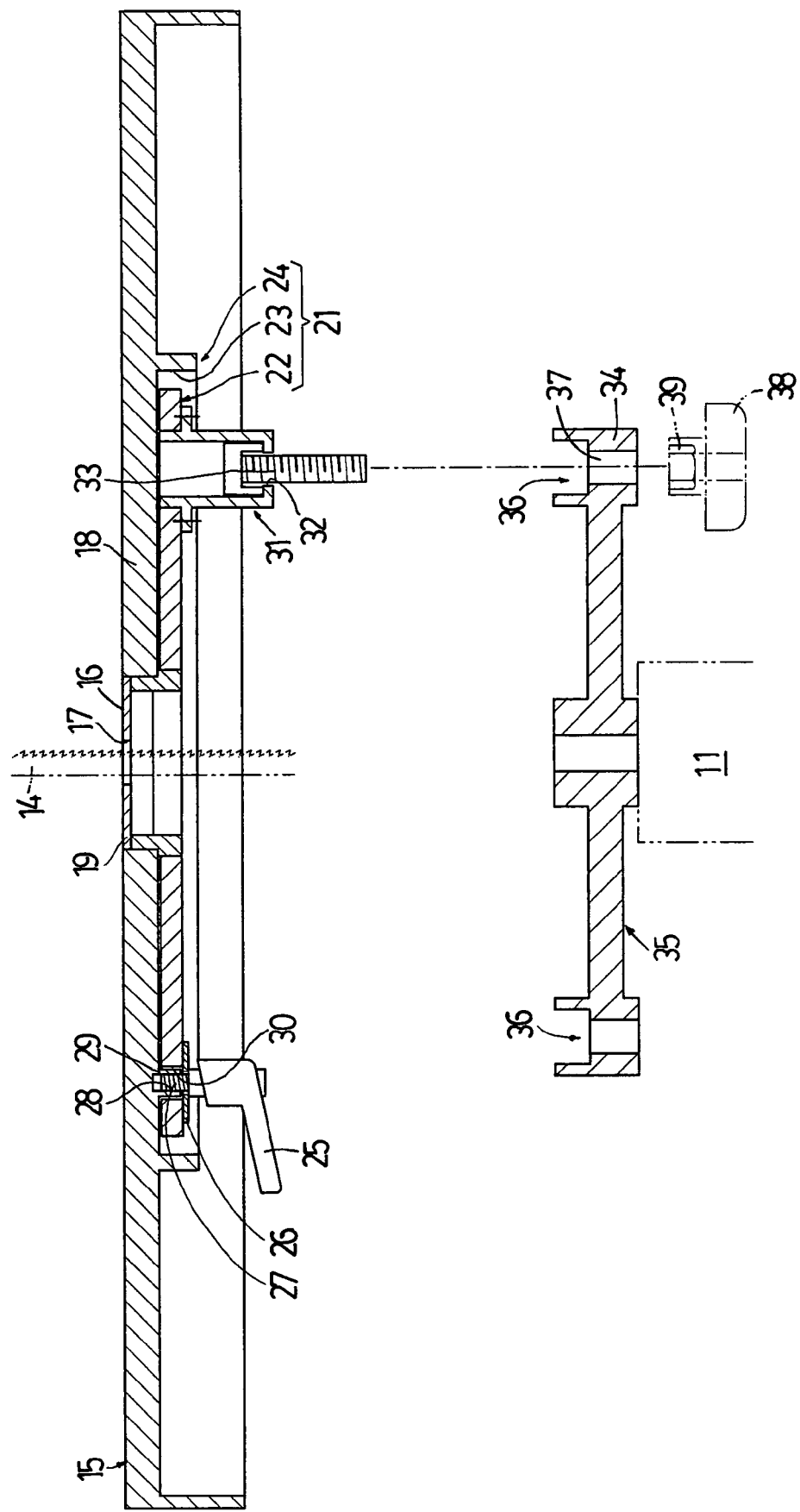
FIG. 4 is a cross-sectional view of a portion of the working board in the invention.

The working board 15 has a board face 18 having a square planar shape for performing an operation for cutting the work. A flange 19 able to place the edge port plate 16 is attached to an opening of a central portion. Further, a working board support portion 21 is arranged to support the working board 15 so as to be horizontally rotated with the flexible steel band 14 as a center. When the working board 15 takes a horizontal posture, the working board support portion 21 has one object in which the working board 15 is supported so as to be horizontally rotated with the flexible steel band 14 as a center. The illustrated working board support portion 21 is constructed by a base portion 22 arranged on the band saw main body side and having a circular planar shape, and is also constructed by a receiving portion 24 arranged on this circular base portion and having a circular concave portion 23 fitted to the circumference of the circular base portion 22. See FIGS. 3 and 4.

The base portion 22 and the receiving portion 24 have a construction able to fasten and integrally fix the base portion 22 and the receiving portion 24 by a fastening tool 25. The fastening tool 25 has a flange portion 26 and a male screw 27 in a shaft portion of the tip vicinity of an operating lever. A partner portion 29 having a female screw 28 screwed to this male screw 27 is arranged integrally with the working board 15, and can rotate the working board 15 in the range of a long hole 30 of a rotating direction formed in the base portion 22. The fastening tool 25, the flange portion 26, the male screw 27, the female screw 28 and the partner portion 29 constitute a working board fixing portion for fixing the working board 15 to the receiving portion 24 of the band saw main body side.

A working board guide portion 31 for guiding the working board 15 so as to be inclined with respect to the flexible steel band 14 is formed in a downward arc shape on a lower face of the base portion 22 of the working board support portion 21. The working board guide portion 31 is arranged at least two places at an equal interval in a circumferential direction with the flexible steel band 14 as a center. A long hole 32 is also formed along each arc face, and a bolt 33 movable along the arc face is further arranged within the long hole 32.

Guide portion receiving portions 34, 34 are arranged correspondingly to the guide portions 31, 31 of the working board side in a similar position relation by the same number of places in a member 35 of the side of the band saw main body 11. The guide portion receiving portion 34 has an arc groove portion 36 able to come in slide contact with the working board guide portion 31 of the downward arc shape. A bolt insertion hole 37 is arranged in a central portion of each guide portion receiving portion 34. Reference numeral 38 designates a fixing member, and a nut 39 screwed to the bolt 33 is arranged.

A laser projector 40 is equipped on the band saw main body side. When the work W is straightly cut by the flexible steel band 14 on the working board and a cutting line is shifted from the straight line, the laser projector 40 projects a laser beam so as to be overlapped with this shifted cutting line. The illustrated laser projector 40 is attached to a front cover of the band saw main body 11 parallel to a rotating face of the flexible steel band 14 by a mount portion 41. As shown in FIG. 2, the laser projector 40 can be directed to an arbitrary direction by a universal joint.

Figure 5:
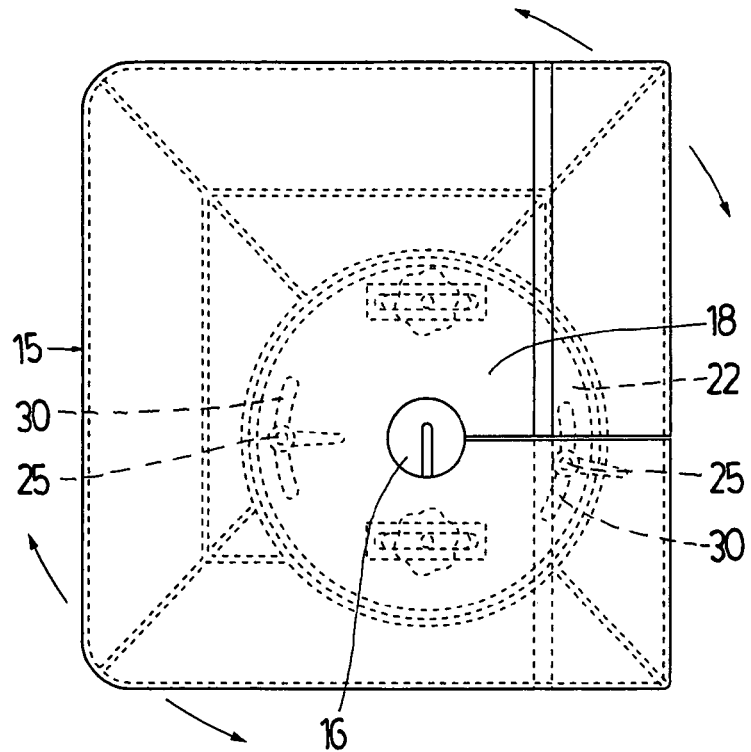
FIG. 5 is a plan view for an operating explanation in the invention.
Figure 6:
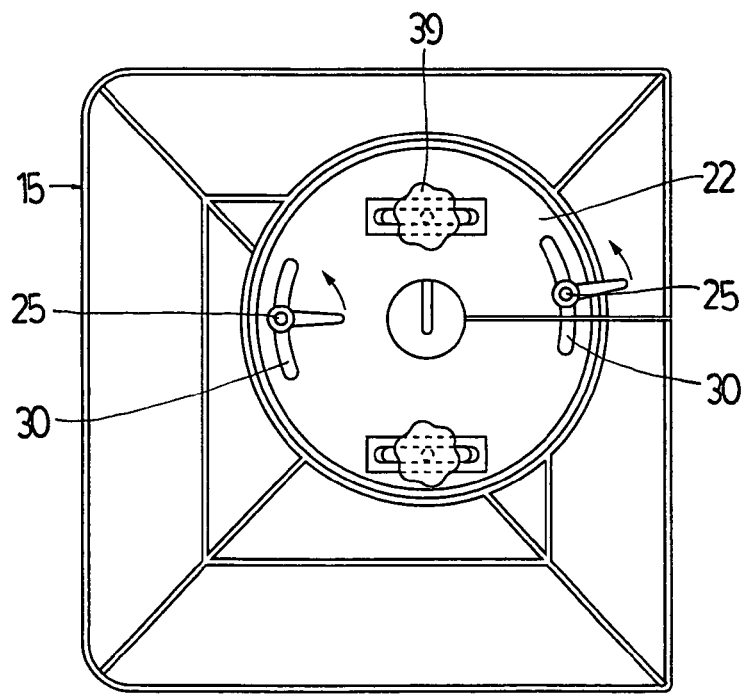
FIG. 6 is similarly a bottom view.

As shown in FIGS. 5 and 6, the cutting auxiliary device in the band saw of the invention constructed in this way can support the working board 15 so as to be horizontally rotated with the flexible steel band 14 as a center when the working board 15 takes a horizontal posture by the working board support portion 21. Namely, the working board 15 can rotated within a horizontal plane with the flexible steel band 14 as a center.

Figure 7:
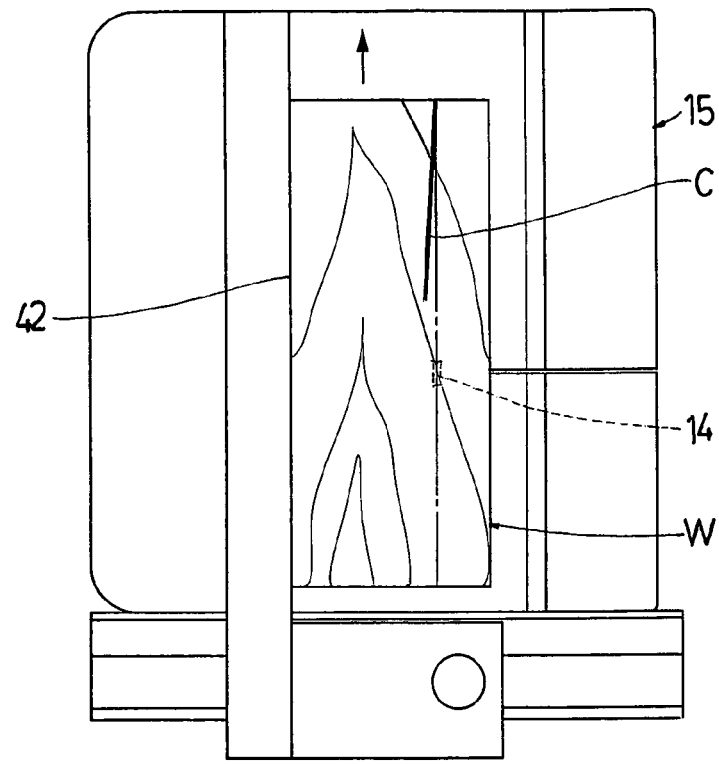
FIG. 7 is an explanatory view showing a generating state of a drift.
Figure 8:
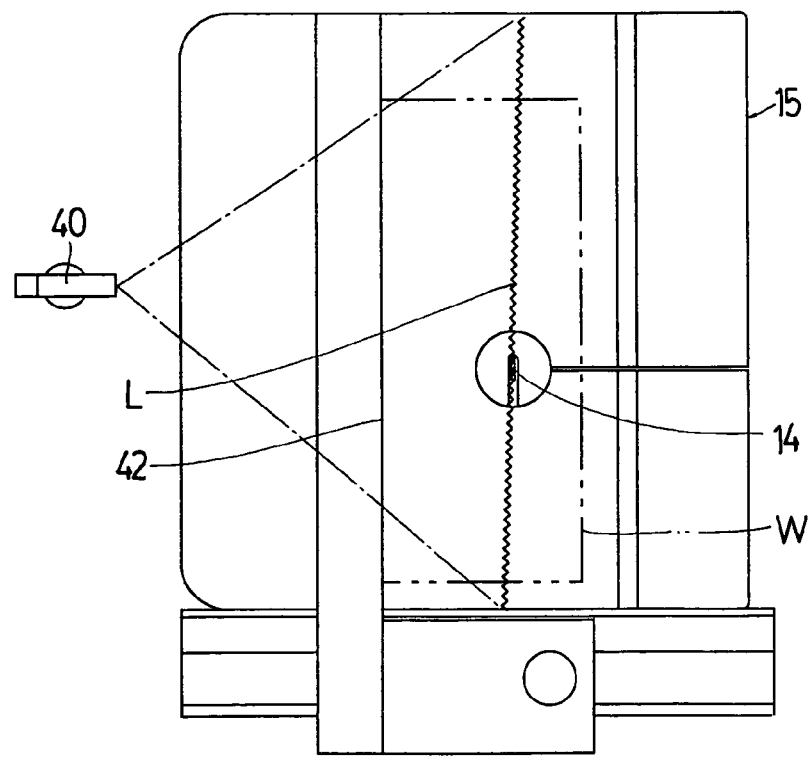
FIG. 8 is an explanatory view showing an irradiating state of a laser beam.

Therefore, the work W is held to a ruler 42 arranged in the working board 15, and a marking-off line drawn in the work W is aligned with the flexible steel band 14, and a band saw is started and the work W is fed with respect to the flexible steel band 14. As its result, there is a case in which the cutting line C is shifted from the marking-off line as a target by the drift. Its situation is shown in FIG. 7. In such a case, the laser projector 40 attached to a front face of the band saw main body is operated and the laser beam is projected so as to be overlapped with this shifted cutting line C (FIG. 8). There is a limit with respect to a size able to move the steel band 14 leftward and rightward. When the drift becomes excessively large in a process for cutting the work W while the work W is pressed against the ruler 42, no work W can be cut by resistance applied to the steel band 14. The state of FIG. 7 exceeds a limit able to move the steel band 14 leftward if this state is set to the real size. However, this state is illustrated for convenience of the explanation.

Figure 9:
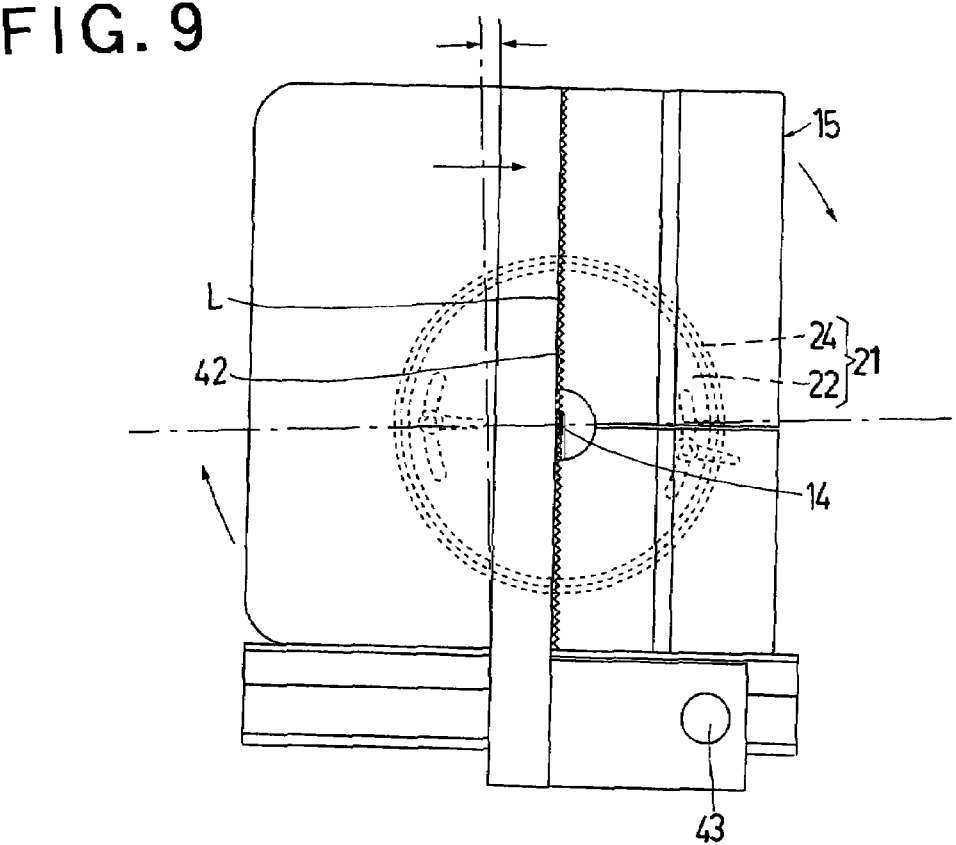
FIG. 9 is an explanatory view showing a rotating state of the working board.
Figure 10:
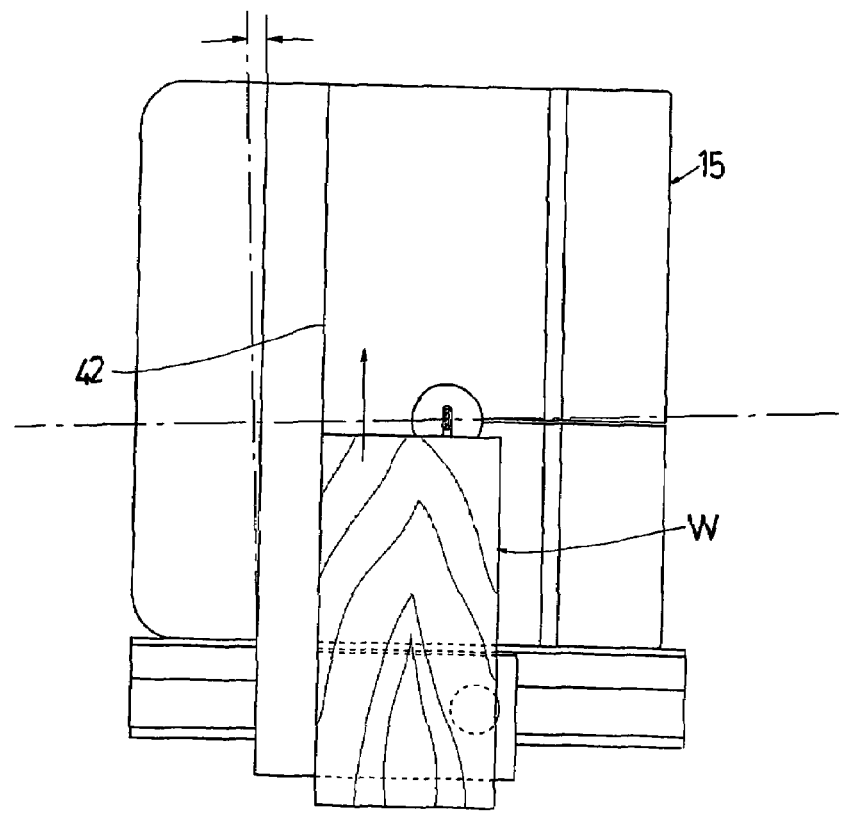
FIG. 10 is an explanatory view showing a cutting work state after the drift is adjusted.

Next, all the fastening tools 25, 25 of a lower face of the working board are loosened, and the working board 15 is rotated with the flexible steel band 14 as a center. Further, a handle 43 of the ruler 42 is loosened and is moved in parallel on the working board, and the ruler 42 is aligned with an irradiating line L of the laser beam. Thereafter, all the fastening tools 25, 25 are fastened, and the handle 43 is fastened and fixed (FIG. 9). Thus, the ruler 42 as a mark on the working board is aligned with the irradiating line L of the laser beam projected from the laser projector 40, and the drift is adjusted. Thus, the work W is fed while the work W is held to the ruler 42 finished with respect to the drift adjustment. The work W can be thus accurately cut as shown by the marking-off line as shown in the state of FIG. 10.

The fixing member 38 is loosened and the working board guide portion 31 of the downward arc shape comes in slide contact with the arc groove portion 36, and the working board 15 can be inclined. The working board 15 can be also inclined when the working board 15 is rotated. After the inclination is set, the fixing member 38 is fastened and fixed. A cutting work with respect to the work W can be executed in a state in which the working board 15 is inclined in an arbitrary direction.

The cutting auxiliary device of the invention has a construction for supporting the working board 15 so as to be horizontally rotated by the working board support portion 21 with the flexible steel band as a center. Accordingly, in a state in which the drift adjustment is finished and the working board 15 is rotated, a miter gauge can be engaged and attached to an engaging groove 45 of the working board 15. Therefore, the miter gauge can be effectively used in comparison with the conventional case.

What is claimed is:

1. A cutting auxiliary device used to correct a shift of a cutting line when the cutting line is shifted from a straight line in a band saw for cutting a work by using a flexible steel band, the cutting auxiliary device comprising:
    a band saw body,
    a working board mounted on said band saw body, said working board having a board face for supporting the work during cutting and an edge port plate for passing the flexible steel band through the board face, said working board being fixed in position;
    a working board support portion being horizontally rotated with respect to the working board using the flexible steel band as a center;
    a laser projector attached to the band saw body and projecting a laser beam, said laser beam being movable from a first position where the laser beam is initially overlapped with the cutting line when the work is straightly cut by the flexible steel band on the working board and said laser beam being movable to a second position where the laser beam is at a correct positioning of the cutting line at an angle with respect to the flexible steel band when the cutting line is subsequently shifted from the straight line of the first position of the laser beam due to a drift between the band saw and the work; and
    a working board fixing portion for fixing the working board support portion in place with respect to a receiving portion of the working board in a place where the straight line of the laser beam projected from the laser projector and a mark on the working board are aligned after the work has been rotated by the working board support portion.

2. The cutting auxiliary device in the band saw according to claim 1, wherein the working board support portion is a base portion having a circular planar shape and arranged on the band saw main body side, and also includes the receiving portion arranged on the circular base portion and having a circular concave portion fitted to the circumference of a circular base portion; and
    the base portion and the receiving portion are fastened and integrally fixed by a working board fixing tool attached to a lower face of the base portion.

3. The cutting auxiliary device in the band saw according to claim 1, wherein a working board guide portion for guiding the working board so as to be inclined with respect to the flexible steel band is arranged on a lower face of the working board in at least two places at an equal interval in a circumferential direction with the flexible steel band as the center, and a guide portion receiving portion is arranged at a same number of places on the band saw main body side at a position corresponding to the working board guide portion.

* * * * *